UNITED STATES PATENT OFFICE.

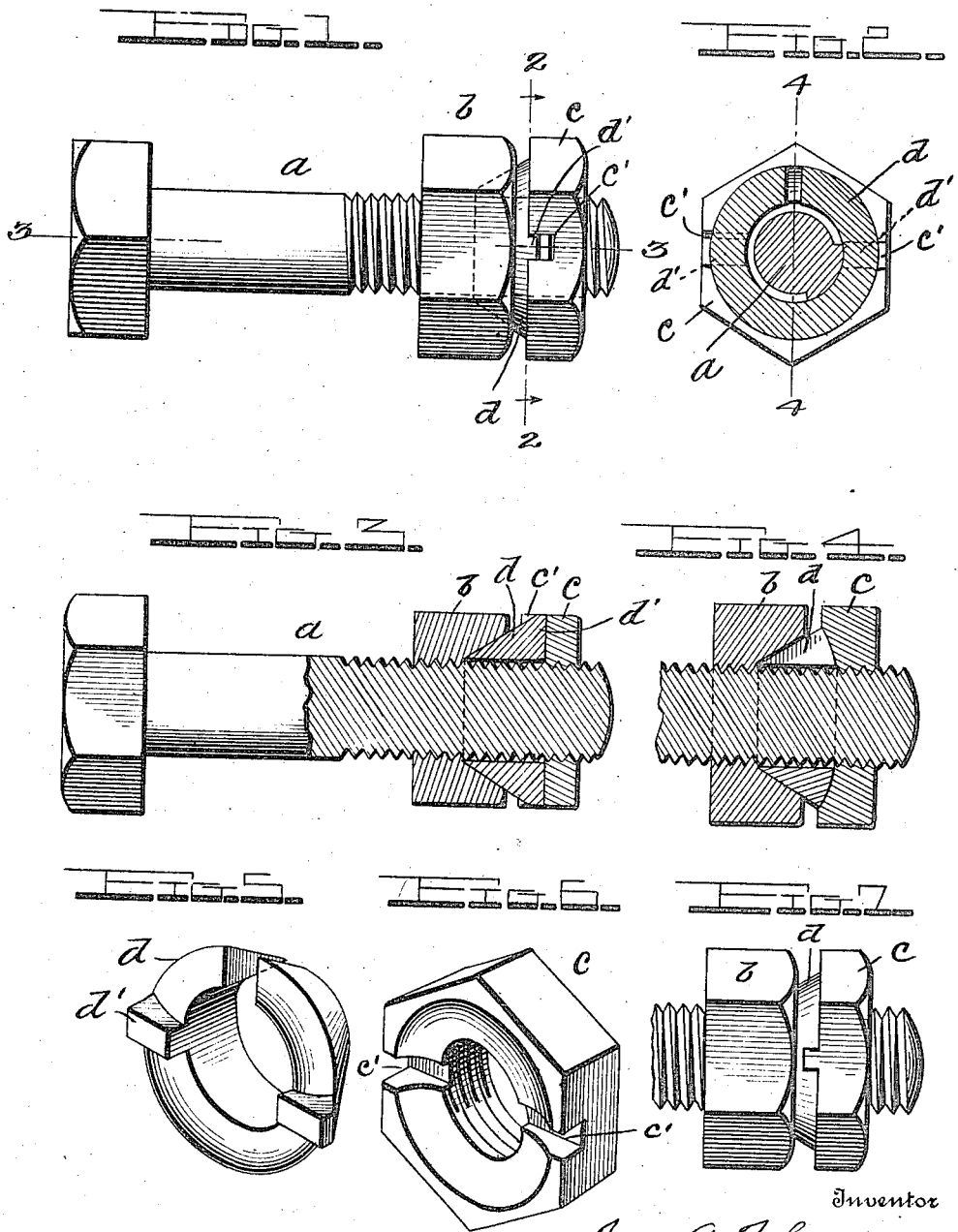

FREDERICK A. FEHRENZ, OF SYRACUSE, NEW YORK.

NUT-LOCK.

1,144,645.  Specification of Letters Patent.  Patented June 29, 1915.

Application filed January 5, 1915. Serial No. 682.

*To all whom it may concern:*

Be it known that I, FREDERICK A. FEHRENZ, a citizen of the United States of America, and a resident of Syracuse, county of Onondaga, State of New York, have invented certain new and useful Improvements in Nut-Locks, of which the following is a full and clear specification, reference being had to the accompanying drawings, in which—

Figure 1 is a side elevation of a nut and bolt provided with my invention; Fig. 2 is a transverse section on the line 2—2 of Fig. 1; Fig. 3 is a view partly in side elevation and partly in longitudinal section; Fig. 4 is a longitudinal section on line 4—4 of Fig. 2 showing a slight modification; Fig. 5 is a detail perspective view of the grip ring or washer; Fig. 6 is a detail perspective of the lock nut illustrated in Fig. 4; and Fig. 7 is a detail side elevation showing a slight modification.

The object of this invention is to provide a simple means for locking the nut on the bolt, to thereby hold it against the work and prevent it loosening by turning backward, and this invention consists of certain novel features of construction hereinafter described and claimed.

In the drawings $a$ designates a bolt of the usual construction and $b$ a work-holding nut of the usual construction, except that on its outer face, around the bolt hole, it is provided with a beveled groove or counter-sink.

The letter $c$ designates a lock nut which is threaded on the bolt in the usual manner and is similar to the work nut except that in its inner face it is provided with two radial grooves $c'$, one of which is a trifle the larger for a purpose hereinafter set forth, said grooves extending from the bolt hole to the edge of the nut.

The letter $d$ designates a grip-ring or washer, which is split at one point in its circumference and is flat on its outer face to fit squarely against the inner face of the lock and beveled on its inner face to fit the beveled counter-sink of the work nut, this beveling of the inner face of the grip-ring giving to the grip-ring a conical shape. This ring or washer is adapted to loosely slide over the threads of the bolt and on its outer face it is provided with two outwardly-projecting lugs $d'$ shaped to fit in the groove or grooves in the inner face of the lock nut.

To bring the locking device into action, the work nut is first screwed home, then the grip-ring and the lock nut are put in position on the bolt. The lug or lugs of the grip-ring interlock it with the lock nut, so that as the lock nut is screwed up to the work nut the grip-ring will be jammed into the beveled counter-sink of the work nut, and the beveled surfaces of the counter-sink and the elastic grip-ring will cause the grip-ring to be contracted and thus jammed hard against the threads of the bolt. In this manner the work nut is held against backward turning until the lock nut is loosened.

It will be observed that my device is exceedingly simple in construction and effective in operation. It will be observed also that changes in details may be resorted to without departing from the spirit of my invention except as limited by the claims; for instance, any suitable number of lugs and recesses may be employed, and, furthermore, the arrangement of the lugs and recesses may be reversed, the lugs being carried by the lock nut and the recesses formed in the grip-ring, as shown in Fig. 7. It will be seen also, as shown in Figs. 4, 5 and 6, that the inner face of the lock nut may be slightly concave and the outer face of the grip-ring be correspondingly convex, so that the tendency to grip the ring on the thread will be somewhat increased when the lock nut is tightened up. It will be seen also that one of the grooves $c'$ in the lock nut is slightly larger than the other, this being apparent from Fig. 2; the object of this is to provide a sufficient lost motion between the grooves and their interlocking lugs $d'$ to permit the washer or grip-ring to expand and contract.

It will also be observed that the device affords a practical locking nut where a fine adjustment is necessary, as it may be securely locked in any desired position on a threaded member without being forced against the work. It will be further noted that this device is not confined solely to use on bolts, but may be successfully used whenever a nut is used in connection with a threaded member.

Having thus described my invention, what I claim is:

1. In combination with a bolt and nut, the latter having a beveled counter-sink in its outer face, a split grip-ring or washer, having its inner face beveled to fit within said counter-sink and its outer face provided with one or more lugs, said grip-ring or washer being adapted to slide loosely over the threads of the bolt, and a lock nut threaded on the bolt provided with one or more recesses adapted to receive the lugs on the grip-ring, whereby the grip-ring and the lock nut are compelled to rotate together in jamming the grip-ring into the threads and in releasing it from the threads.

2. In combination with a bolt and nut, the latter having a beveled counter-sink in its outer face, a split grip-ring having its inner face beveled to fit within said counter-sink and adapted to slide loosely over the threads of the bolt, a lock nut threaded on the bolt adapted to abut the outer face of the grip-ring, and one or more interlocking lugs or recesses on the grip-ring and lock nut for causing the grip-ring to rotate with the lock nut in jamming the grip-ring into the threads of the bolt and in loosening it from the threads.

In testimony whereof I hereunto affix my signature in the presence of two witnesses.

FRED. A. FEHRENZ.

Witnesses:
MARY C. FRIEDEL,
VERA E. BERTRAND.